United States Patent Office 3,225,053
Patented Dec. 21, 1965

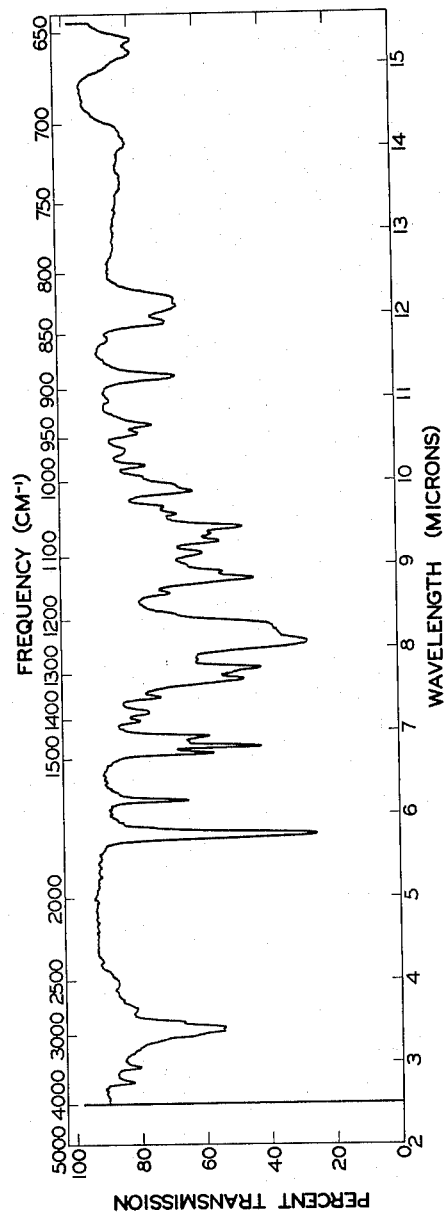

3,225,053
QUEBRACHIDINE AND DERIVATIVES
Marvin Gorman, Indianapolis, Ind., assignor to Eli Lilly and Company, Indianapolis, Ind., a corporation of Indiana
Filed Jan. 10, 1963, Ser. No. 250,583
4 Claims. (Cl. 260—294.3)

The present invention relates to physiologically active alkaloids. More particularly the invention relates to entirely new alkaloids prepared from the leaves of a South American medicinal plant of the family of Apocynaceae, subfamily Plumerioideae, genus Aspidosperma, and species *quebracho-blanco* Schlecht.

Previously a number of alkaloids have been prepared from the roots or bark of the quebracho or "axe-breaker" plant, including aspidospermine, yohimbine, quebrachamine, aspidospermatine, and eburnamemine. The present invention represents the first instance in which an alkaloid has been obtained from the leaves of *A. quebracho-blanco* Schlecht. The new substance, which has been named quebrachidine, differs from the previously prepared alkaloids in that it is the first representative of the ajmaline type to be obtained from the quebracho plant.

It is an object of this invention to provide a new alkaloid, quebrachidine, which possesses new and unexpected properties as a psychosedative and adrenergic blocking agent, combined with exceptionally low toxicity. Another object is to provide O,N-diacetylquebrachidine, useful as a synthetic intermediate for preparing O-acetylquebrachidine. A further object is to provide O-acetylquebrachidine which, like quebrachidine, possesses psychosedative and adrenergic blocking properties combined with very low toxicity.

The new compounds of the present invention have structures which can be represented by the following formula:

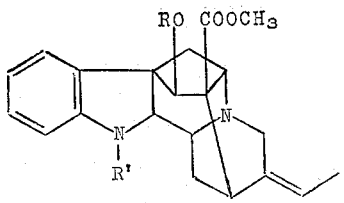

wherein R and R' represent hydrogen or acetyl. When R=R'=H the formula represents quebrachidine; when R=R'=acetyl, O,N-diacetylquebrachidine is illustrated; and when R=acetyl and R'=H, then O-acetylquebrachidine is defined by the formula.

Quebrachidine, O,N-diacetylquebrachidine, and O-acetylquebrachidine form salts with pharmaceutically acceptable strong acids, illustratively hydrochloric acid, hydrobromic acid, hydriodic acid, sulfuric acid, phosphoric acid, and the like, and such salts are considered to be part of the invention.

Quebrachidine can be obtained by suitable treatment of the pulverized leaves of *A. quebracho-blanco* Schlecht., employing for example the general method for preparing alkaloids from plant materials of Gorman et al., J. Am. Chem. Soc., 82, 1142 (1960). The product is a white, high-melting, crystalline solid, having a melting point of about 276–278° C. and a specific rotation of $[\alpha]_D^{26}=$ +54° (C=1 in chloroform). The free base has a characteristic infrared spectrum, shown in FIGURE 1, in which the determination was made in chloroform solution.

Quebrachidine is a 2,3-disubstituted dihydroindole, as indicated by its ultraviolet absorption spectrum when run in 95 percent ethanol, showing maxima as follows:

| λ | ε |
|---|---|
| 242 | 6,500 |
| 291 | 2,975 |

A second basic nitrogen, $pK_a'$ 6.7, is also present in the molecule. As shown by nuclear magnetic resonance studies, there is no other aromatic substitution (four aromatic proton multiplet $\delta=6.6$ to 7.2 p.p.m.); the ester is a carbomethoxyl ($\delta=3.6$ p.p.m.), and there is an ethylidene grouping present in the molecule (methyl doublet centered at $\delta=5.1$ p.p.m., with $J=6.5$ cps.).

Mass spectrometry shows the molecular weight to be approximately 352, which, with the above physical measurements, establishes the empirical formula as $C_{21}H_{24}N_2O_3$. The presence of intense peaks in the mass spectrum at $m/e$ 130 and $m/e$ 143 (indole nucleus with one and two carbons, respectively) supports the dihydroindole structure lacking substituents in the benzene ring and at the dihydroindole nitrogen.

O,N-diacetylquebrachidine is readily prepared by acetylation of quebrachidine in pyridine, and is ordinarily obtained as an amorphous material. Selective de-acetylation using dilute aqueous sulfuric acid yields O-acetylquebrachidine, a white, crystalline solid melting at about 194–197° C.

The therapeutic principles herein disclosed are particularly adapted for the treatment of anxiety and tension states, especially those with psychosomatic mechanisms. Quebrachidine and its derivatives have new and unexpected psychosedative properties qualitatively similar in many respects to those of reserpine, well known for its therapeutic uses and properties, but they exhibit none of the toxic effects of reserpine. In addition, the compounds of the present invention possess adrenergic blocking properties and these important properties are enhanced by an extremely favorable and desirable therapeutic index. The therapeutic action of these compounds may be described as "calming" or "sedative-like," but differs from commonly used sedatives such as barbiturates, chloral hydrate, and the like in that there is much less, if any, effect in depressing higher mental function.

The therapeutic principles hereby disclosed appear to have effective oral dosages in the range of about 25 mg. to about 1,000 mg., the dose varying, of course, with the age, weight, and condition of the patient. Optimum results may be had at a dose of around 150 mg. to 750 mg. The active principle can be compounded in the form of tablets, pills, capsules, suspensions, and the like with conventional excipients and other pharmaceutically acceptable ingredients.

The following examples will serve to illustrate the invention.

EXAMPLE 1

*Quebrachidine*

Five kilograms of dried, ground leaves of the plant *A. quebracho-blanco* Schlecht. were extracted twice with 20-liter portions of Skellysolve B to defat the material, the extracts were discarded, and the residue was dried. The dry residue was treated with enough 10 percent aqueous ammonium hydroxide to bring the pH to 9. The mixture was then extracted repeatedly with benzene until the extracts no longer gave a positive reaction to Mayer reagent.

The combined benzene extracts were concentrated to dryness in vacuo. The dry residue was redissolved in benzene to a volume of two liters. To this solution was added one liter of 10 percent aqueous acetic acid solution. The resulting mixture was concentrated in vacuo to remove the benzene and then filtered. The insoluble residue on the funnel was re-extracted twice more by this same procedure. In this manner, the alkaloids from the leaves were extracted into an aqueous acetic acid solution. Insoluble impurities were removed by filtering through diatomaceous earth. The acid solution was then made alkaline by adding 28 percent aqueous ammonium hydroxide, thereby precipitating the basic products, which were extracted into methylene chloride. The extract was dried, and the solvent was evaporated in vacuo, leaving a residue containing quebrachidine and other alkaloids. The residue was taken up in 500 ml. hot benzene and then concentrated slowly and carefully in vacuo. Crystals of quebrachidine which formed were filtered in two crops of about 8.5 g. and 3.2 g., respectively. Recrystallization from ethanol yielded white crystals of quebrachidine having a melting point of about 276–278° C. and specific rotation $[\alpha]_D^{26} = +54°$ (C=1 in chloroform).

EXAMPLE 2

*O,N-diacetylquebrachidine*

Quebrachidine, 500 mg., was dissolved in 5 ml. pyridine and 3 ml. acetic anhydride added. The reaction mixture stood at room temperature for 16 hours, after which the solvent was removed in vacuo, leaving a residue which contained crude O,N-diacetylquebrachidine. This crude material was dissolved in 10 percent aqueous acetic acid and 28 percent aqueous ammonium hydroxide added to make the solution basic. O,N-diacetylquebrachidine which precipitated was extracted into ether, and the ether solution was dried and then concentrated in vacuo to give 530 mg. amorphous O,N-diacetylquebrachidine. The structure of the product was established via its infrared, ultraviolet, and nuclear magnetic resonance spectra, and purity was confirmed by production of a single spot on thin-layer chromatography.

EXAMPLE 3

*O-acetylquebrachidine*

Two hundred milligrams of O,N-diacetylquebrachidine were selectively hydrolyzed by refluxing with 100 ml. aqueous sulfuric acid at pH 2 for 20 hours. The reaction mixture was cooled in ice and the pH adjusted to 8.5 by adding 28 percent aqueous ammonium hydroxide. The O-acetylquebrachidine formed thereby was extracted into methylene chloride, the solution was dried, and the solvent was evaporated in vacuo. The residue was redissolved in methylene chloride and passed over an alumina column. O-acetylquebrachidine, 95 mg., after recrystallization from ether, had a melting point of about 194–197° C.

I claim:
1. An alkaloid or a salt thereof wtih a pharmaceutically acceptable strong acid, said alkaloid being represented by the structural formula:

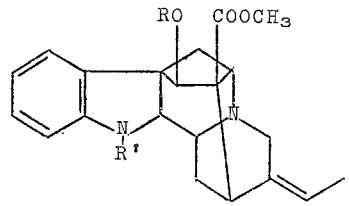

wherein R and R' are members of the group consisting of hydrogen and acetyl.

2. Quebrachidine, a new alkaloid represented by the structural formula:

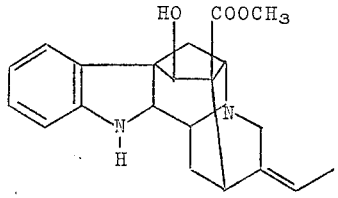

3. O,N-Diacetylquebrachidine, an alkaloid represented by the structural formula:

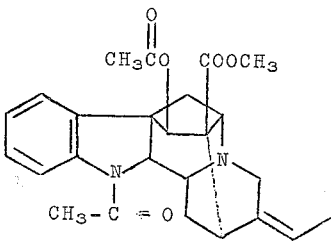

4. O-Acetylquebrachidine, an alkaloid represented by the structural formula:

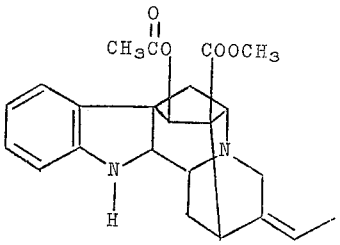

References Cited by the Examiner

Elderfield: Heterocyclic Compounds, Wiley and Co., New York, vol. 3 (1952), pages 83 and 117.

Gosset et al.: Bull. Soc. Chim. Fr., No. 5 (1961), pages 1033–1035.

Richter's Organic Chemistry, Elsevier Pub. Co., New York, vol. IV (1947), pages 62 and 65.

WALTER A. MODANCE, *Primary Examiner.*

JOHN D. RANDOLPH, *Examiner.*